United States Patent [19]
Mueller et al.

[11] 3,832,669
[45] Aug. 27, 1974

[54] TEMPERATURE-SENSING DEVICE

[75] Inventors: Fritz Kurt Mueller; Billy Otis Martin; Robert Cherry, all of Huntsville, Ala.

[73] Assignee: Royal Medical Corporation, Huntsville, Ala.

[22] Filed: June 1, 1972

[21] Appl. No.: 258,728

Related U.S. Application Data

[63] Continuation-in-part of Ser. No. 62,481, Aug. 10, 1970, Pat. No. 3,729,998, and a continuation-in-part of Ser. No. 173,115, Aug. 19, 1971.

[52] U.S. Cl. .............. 338/28, 73/362 AR, 206/47 R
[51] Int. Cl. ............................................. H01c 7/00
[58] Field of Search ................... 338/28, 229, 47 R; 73/362 AR, 343 R; 206/16.5, 46 E

[56] References Cited
UNITED STATES PATENTS

| | | | |
|---|---|---|---|
| 2,753,714 | 7/1956 | Perkons | 338/229 X |
| 3,138,263 | 6/1964 | Brass | 206/16.5 X |
| 3,254,533 | 6/1966 | Tongret | 73/632 R |
| 3,356,980 | 12/1967 | Roberts | 338/28 |
| 3,550,448 | 12/1970 | Ensign | 206/16.5 X |
| 3,650,153 | 3/1972 | Schwab | 73/362 AR X |
| 3,673,868 | 7/1972 | Beury | 73/343 R |
| 3,681,991 | 8/1972 | Eberly | 73/362 AR |
| 3,738,173 | 6/1973 | Sato | 338/28 X |

Primary Examiner—C. L. Albritton
Attorney, Agent, or Firm—Alvin Edward Moore

[57] ABSTRACT

A temperature sensing probe-and-sheath assembly, especially adapted for use in an electronic thermometer but having utility in temperature control and temperature compensation devices, comprising: a probe element of plastic or other material of low heat conductivity, having a handle portion, connectible to a source of electricity, a tip portion and a central channel extending from said handle portion to the tip portion, a piece of metal foil or very thin metal sheet, of high heat conductivity, fixed to said tip portion and extending across a probe-tip widened portion of said channel that forms a narrow endless ridge, losing little of the measured heat, at the tip of the probe; a pre-heating thermistor and a temperature-measuring thermistor, fixed by metal-comprising bonding material to the foil; wiring in the channel between the handle and tip portions, connected to said thermistors; a probe sheath having a blunt tip end snugly engaging the foil, extending over a narrow, endless tip-end ridge of said plastic and ending at a sheath-holding enlarged portion of the probe, with an air-filled clearance between the probe element and sheath along a major part of the probe element's length; and means at the handle portion to cause said sheath to be removed from the enlarged portion.

18 Claims, 19 Drawing Figures

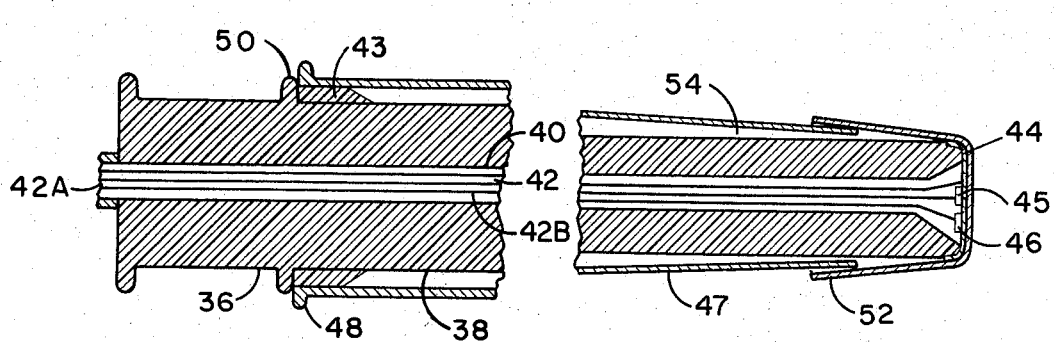
FIG. 1
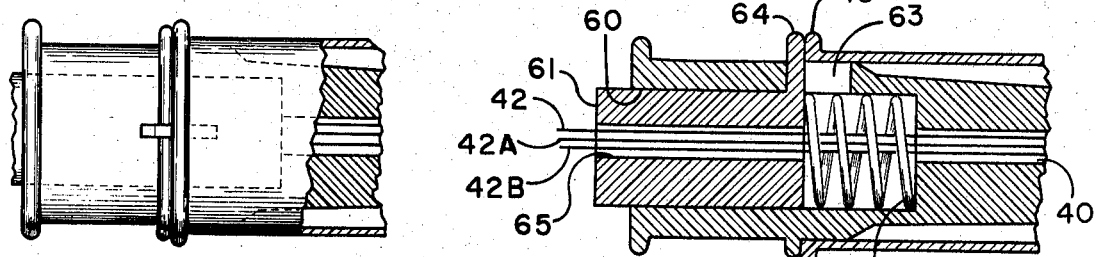
FIG. 2
FIG. 3
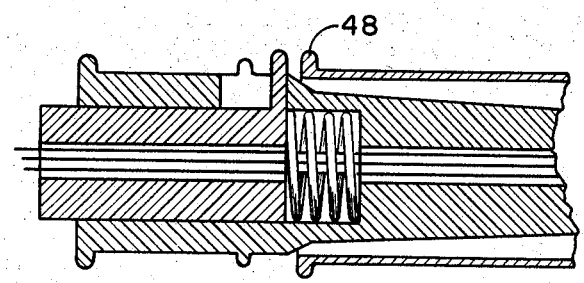
FIG. 4
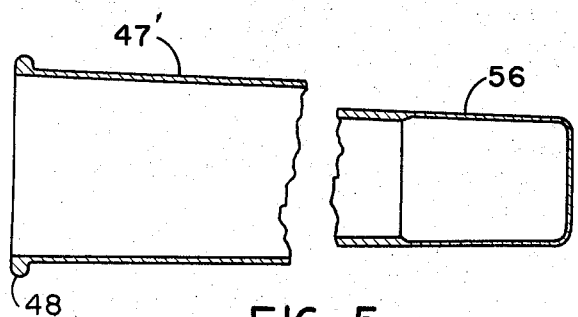
FIG. 5
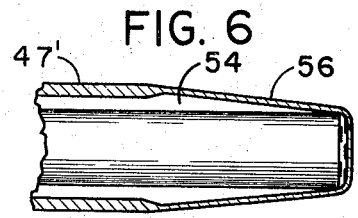
FIG. 6
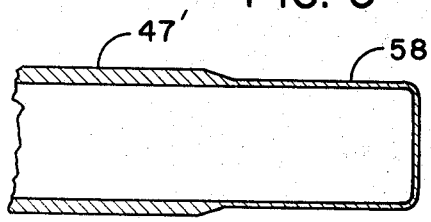
FIG. 7

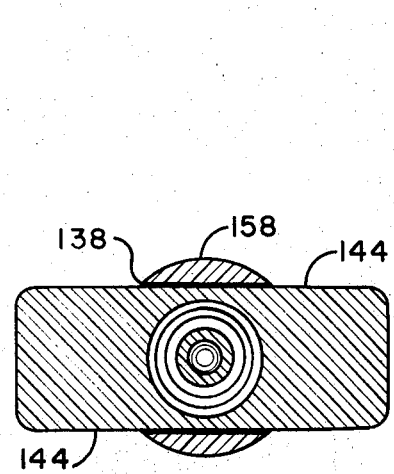
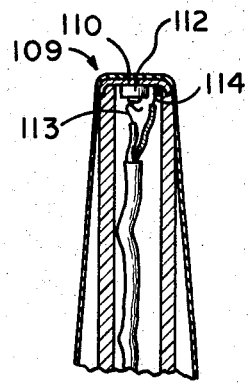
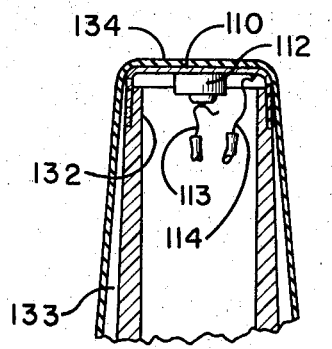
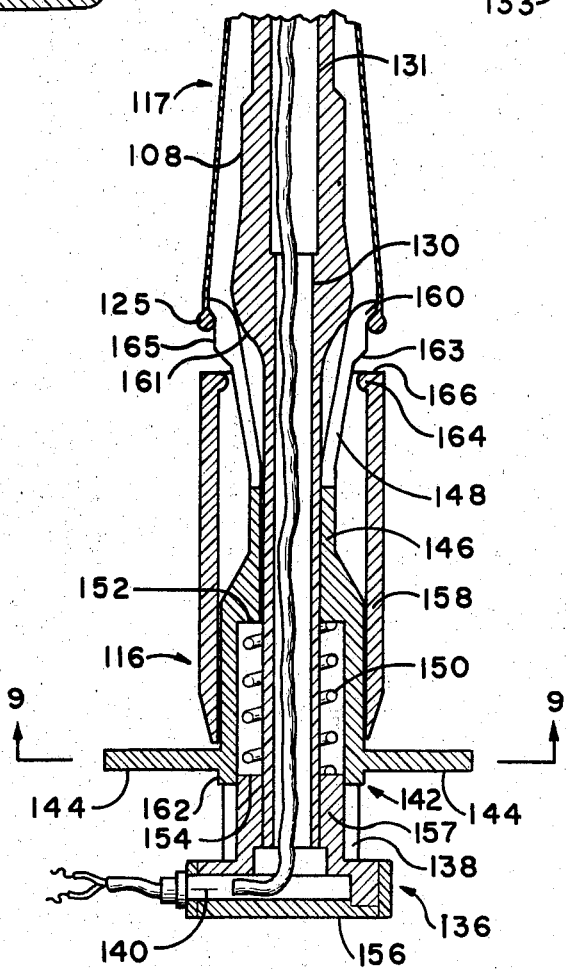
FIG. 9
FIG. 10
FIG. 8

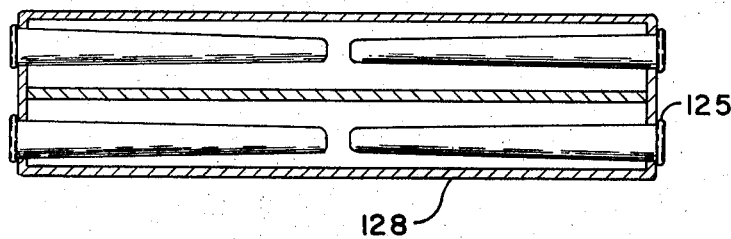
FIG. 13
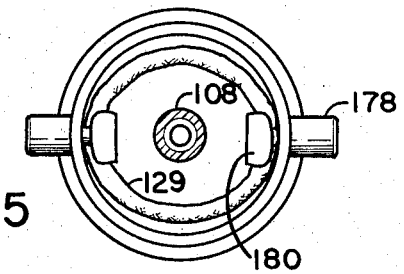
FIG. 15
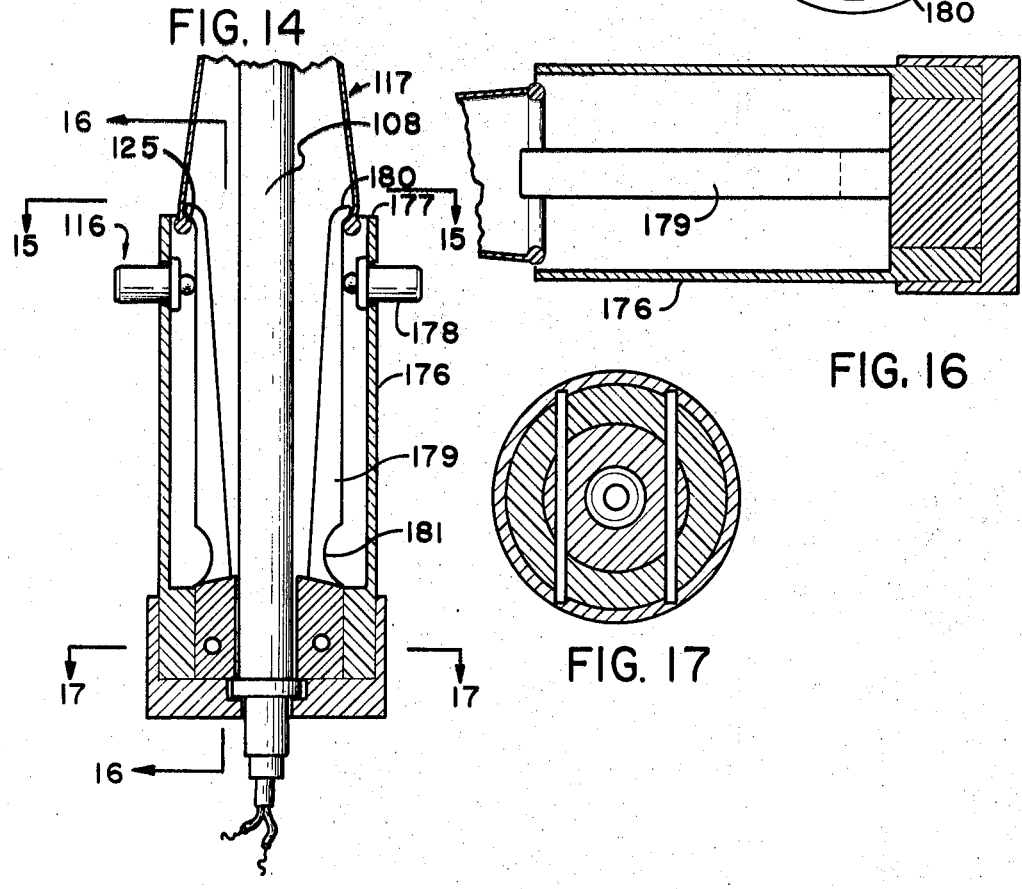
FIG. 14
FIG. 16
FIG. 17

TEMPERATURE-SENSING DEVICE

This patent application is a continuation-in-part of application Ser. No. 62,481, filed on Aug. 10, 1970, now U.S. Pat. No. 3,729,998, comprising matter divided from the earlier case. FIGS. 1 to 7 and 18 are substantially the same as FIGS. 4 to 9 and 1, respectively of application Ser. No. 62,481. The present application also is a continuation-in-part of application Ser. No. 173,115, filed on Aug. 19, 1971, comprising matter divided from it in response to a requirement for restriction. FIGS. 8 to 12 and 14 to 17 are the same, respectively, as FIGS. 8 to 12 and 4 to 7 of application Ser. No. 173,115; and FIG. 13 is closely similar to FIG. 3A of application Ser. No. 173,115.

There is a need in electronic clinical thermometers and other temperature-measuring instruments for a probe-and-sheath assembly where the probe does not contact the object whose temperature is being measured, but such contact is by means of an economical, quickly disposable probe sheath. There is also need for a probe comprising tip-end thermistors that have little heat loss through the end of the probe material or in an elongated air space between a sheath and the probe element. In view of these facts, some objects of this invention are: to provide: (1) a temperature-sensing device comprising a probe element of low heat conductivity, having a central bore, containing wires, widening at the tip end, defining an inner surface of a narrow, endless ridge of the probe-element material, a foil-thickness piece of heat-conducting metal fixed to the endless ridge, across the wide part of the bore, by means of metallic bonding material; (2) a probe assembly comprising a probe element of material having low heat conductivity, having at its handle portion an enlarged, sheath-holding element, and a disposable sheath on the probe element, held by the sheath-holding element during temperature measurement, with the sheath being clear of the probe over a major portion of its length, thus providing an insulating-air space between the sheath and probe-element material; and (3) a device as in (2) above, comprising manually operable means for removing the sheath from the sheath-holding element and from the probe element. Other objects of the invention will be apparent from the following specification and the accompanying drawings. In these drawings:

FIG. 1 is a sectional view of one form of the assembled probe and sheath;

FIG. 2 is a plan view, partly in section and partly broken away, of another form of such assembly, indicating a slide for aid in taking a used cover or sheath off the probe;

FIG. 3 is a sectional view, partly broken away, of the probe of FIG. 2, in section from a plane thru the axis of the probe and at right angles to the sectional plane of FIG. 2;

FIG. 4 is a sectional view, similar to FIG. 3, showing the slide as having been moved to dislodge the sheath from frictional engagement with the probe;

FIG. 5 is a sectional view, partly broken away, of an optional, integral form of the disposable sheath;

FIG. 6 is a detail sectional view of the assembled outer ends of the sheath of FIG. 5 and the probe;

FIG. 7 is a sectional view, partly broken away of another form of the integral sheath;

FIG. 8 is a sectional view of another form of the probe-and-sheath assembly, partly broken away, in section from a plane containing the probe's axis;

FIG. 9 is a view in section from the plane 9—9 of FIG. 8;

FIG. 10 is an enlarged detail view of the tip end of the probe;

FIG. 13 is a sectional view through an optional form of pack of the disposable sheaths;

FIG. 14 is a sectional view, partly broken away, of another optional form of the assembed probe and sheath, in section from a plane containing the axis of the probe;

FIG. 15 is a view in section from the plane 15—15 of FIG. 14;

FIG. 16 is a view in section from the plane 16—16 of FIG. 14;

FIG. 17 is a view in section from the plane 17—17 of FIG. 14; and

Figure 18:
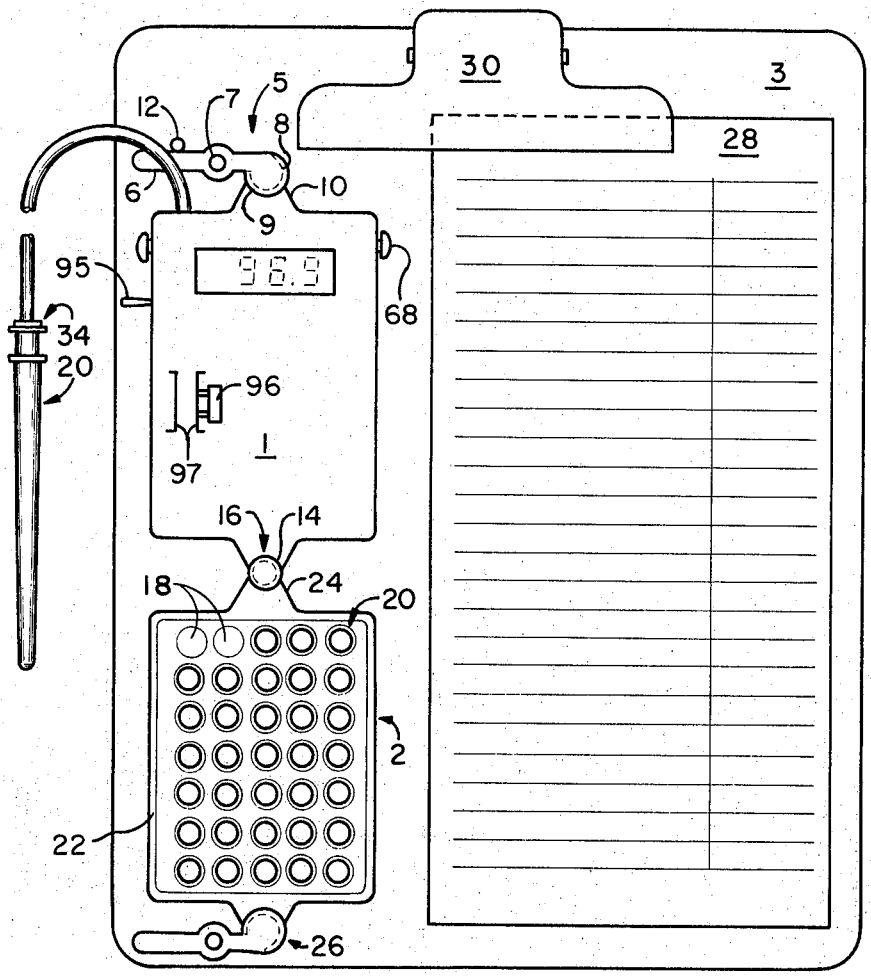
FIG. 18 is a top plan view of the temperature measuring device on a board or the like, supporting the invented probe-and-sheath assembly.

FIG. 18 illustrates an optional final assembly of the probe-and-sheath assembly as preferably part of an electronic clinical thermometer, here shown as on a hospital board or the like. This final assembly comprises: a thermometer case or container 1, a package of disposable probe sheaths 2, and a box or nurse's hospital board 3. The container 1 preferably supports batteries on a removable container bottom. These may be rechargeable; but optionally they and the removable bottom may be discarded and replaced.

The electronics case 1 is detachably fastened to the board 3 by a spring-actuated clip 5 and the stud 16. The clip 5 comprises: a bellcrank lever 6, pivoted to the board at 7, having an end part 8 and an overlying flange 9; and a coil spring, coiled around the pivot pin 7, having one end fastened to the board and the other end fixed to the end of the lever having the part 8, continually urging this part into tight engagement with the curved upper surface of the end projection 10 of the case. When the case is taken off the board the stop pin 12 limits rotary movement of the lever.

The case is positioned on the board by moving the lever handle 6 downward, shoving the lower, indented projection of the cover downward under the head 14 of the stud 16, and releasing the lever, so that its part 8 moves into engagement with the recess or socket.

The box 2 of disposable probe covers or sheaths comprises: sockets or wells 18, into each of which a disposable probe sheath 20 may be placed where it rests in upright position; and a cover, having a flange fitting around the top edge of wall 22, this box in FIG. 18 being shown without the cover, which has been removed by the nurse in her operation of the thermometer. At the top of each end of wall 22 there is a lug 24, one of which fits under head 14 of the stud 16, and the other is fixed to the spring-pressed clip 26, which is similar to the clip 5.

A nurse's temperature chart 28 is held on the board by the spring-pressed clip 30. In FIG. 18 the digital temperature indicator is registering the below-normal temperature of the last patient whose temperature has been measured.

The probe element is shown in FIG. 18 as frusto-conical and in a frusto-conical sheath 20. This probe-and-sheath assembly optionally is in one of the four forms shown in FIGS. 1 to 4, 8, 11 and 14. In FIG. 1 the probe element is shown as comprising: a handle 36; a frusto-conical shaft portion 38; a bore 40, through which three enameled or varnished electrical wires 42, 42A and 42B extend; protuberant means on said shaft portion, shown as comprising at least two diametrically positioned longitudinal ribs 43, which frictionally hold the inner end of the disposable probe sheath; the metal probe-end plate 44 (preferably of gold foil); and the probe-preheating and temperature-measuring thermistors 45 and 46. These thermistors are fixed to the probe-end plate by bonding material comprising metal, for example soldering, and comprise known thermistor material (semi-conductive metallic oxides). This material has a large change of resistance with change of temperature, and, as pointed out below, the resulting voltage change is measured. As indicated in FIG. 4 and FIG. 10, one of these thermistors (46) is used to preheat the end of the probe. Optionally, but not preferably, a disk-like type of resistance (for example comprising carbon) may be substituted for this preheating thermistor.

As shown in FIG. 1, the probe sheath (which is preferably of molded plastic) comprises: frusto-conical part 47; the stop flange 48, which in use abuts the annular handle stop 50; and the sheath tip 52, which is made separately from part 47 and bonded to it, by heat or glue. In this form the portion 47 optionally is of resilient plastic (thicker and stronger than the material of 52), but it may be of rigid or semi-rigid plastic. The tip portion 52 is of resilient rubber or other resilient plastic. The overall length of the sheath is slightly shorter than the distance between the stop 50 and the outer surface of the plate (foil) 44, so that when the operator places a sheath on the probe he or she stretches the resilient tip until the other, inward end of the sheath rides into a firm seat over the low ribs 43 and the flange 48 abuts stop 50. Then, after measurement of temperature, he holds the flange 48 (which preferably is annular, but optionally may be in the form of a tab) between thumb and finger, and pulls it toward the tip 52. The resiliency of the sheath aids in quick removal of the sheath; and it is then discarded.

FIGS. 6 and 7 show two other, optional forms of the disposable sheath. In each of these forms the main part 47' and the tip portion are integral and preferably of molded resilient plastic. As in FIG. 1, when it is over the probe it has a clearance 54 between nearly all of its inner surface and the probe. In FIG. 6, the inner surface of its thinner tip portion 56 is shown as being of larger diameter and spaced farther from the probe than its main portion 47'. In FIG. 9 the outer surface of the tip part 58 is of less diameter than the adjoining portion of the main part 47'. Another form of the resilient plastic sheath is of uniform thickness throughout its length; that is all of its material is integral and of uniform thickness. In any event: as in the form of FIG. 4, the integral sheath is slightly shorter than the distance between 50 and the outer surface of 44; and this integral sheath is similarly assembled with and removed from the probe.

For convenience of illustration in FIGS. 6 and 7 the integral sheath tip (56 or 58) is shown as it is shaped in the plastic mold; but in practice when the sheath is not on the probe this thin, blunt tip is somewhat collapsed. As shown in FIG. 6, when the sheath is pulled over the probe its tip portion is stretched or expanded into frusto-conical shape. When it has the varying thickness of FIGS. 5 to 7: being thinner, the tip part stretches considerably more than does the part 47.

In each of the forms of the sheath its flange may be directly pulled away from stop 50 by the fingers, aided by the resilience of at least the tip; or optionally and as shown in FIGS. 2 to 4, a latch-like, spring-biased, sheath-removing member may be incorporated in the probe. This member comprises: a socket or cylinder 60 in the handle end of the probe; a sliding element 61, reciprocable in the socket; a spring 62, continually urging the sliding element toward the inward end of the probe; a slot 63 between the socket 60 and the outer surface of the probe; and an element 64, fixed to and preferably integral with the slide 61, projecting radially out of the probe proper, contiguous with the flange 48 when the sheath is stretched over the probe.

As illustrated, the slide 61 is cylindrical, in a socket that is concentric with the bore 40, and has a bore 65 that is in registry with 40 and contains the wires 42, 42A and 42B. But optionally this sliding element and its socket may be to one side of the bore 40, and the slide then may be solid.

In use of this sheath-removing member, the operator presses the inner end of slide 61 toward the spring, thus forcing the flange 48 off the ribs 43. Then the resilience of the sheath tip pulls the flange further from the probe handle, and into the position shown in FIG. 4. From this position the disposable sheath easily slides off the probe when its outer end is tipped downward.

Figure 12:
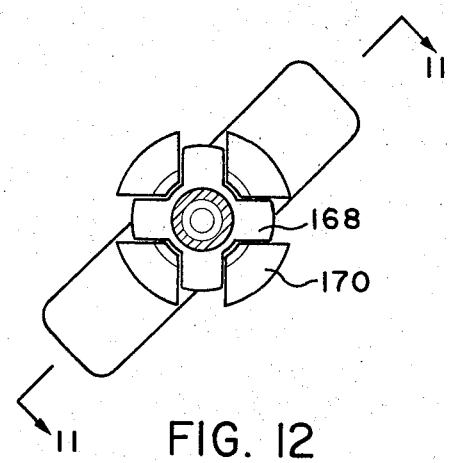
FIG. 12 is a view in section from the plane 12—12 of FIG. 11, with the sheath omitted.
Figure 11A:
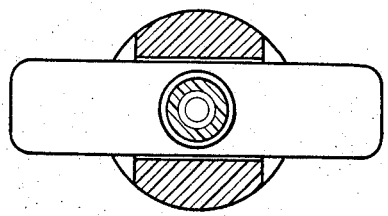
FIG. 11A is a view in section from the plane 11A—11A of FIG. 11.
Figure 11:
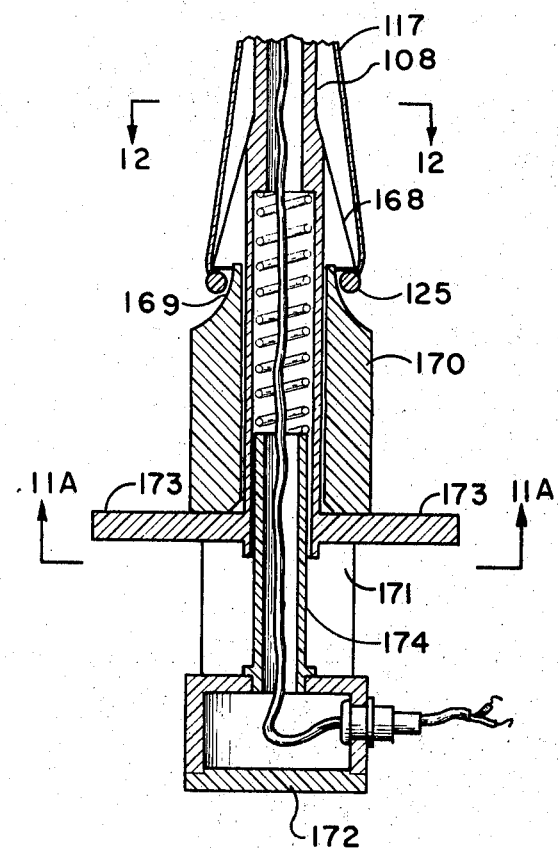
FIG. 11 is a sectional view, from the plane 11—11 of FIG. 12, of another form of the probe-and-sheath assembly.

Three other optional forms of the probe-element-and-sheath assembly are shown in FIGS. 8, 11 and 14. Each of these forms comprises: A sensing-element shaft 108, having an axial bore; a tip portion 109, (FIG. 8) comprising a piece of foil 110, of metal of high thermal conductivity (preferably gold), fixed by bonding material (for example, epoxy cement) to the tip end of the shaft, a disk-like thermistor 112, comprising metallic oxides; current-conducting means in the shaft bore, comprising one wire, 113, connected to the thermistor, and another wire, 114, connected to the foil; a handle assembly 116, comprising means for detachably holding a sheath on the probe; and a disposable probe sheath 117. Each of the sheaths 117 is made of resilient plastic (for example, rubber) and has an end enlargement or ring 125 which in the storage of the sheath in a carton (for example, that shown in FIG. 1 at 2 or in FIG. 13 at 128) fits against a face board or wall of the box. Preferably, this ring 125 has the cross-sectional shape shown in FIG. 8 (for example, made by rolling the open edge of the sheath on a mandrel before curing the latex); but optionally it may have the cylindrical shape shown in FIGS. 1 to 5 at 48 (for example, made during injection molding of the sheath as a whole).

The shaft 108 has a longitudinal bore, encompassing its axis, and comprising two parts: a handleward portion 130 of relatively small cross-sectional area and a shaft-tipward portion 131 of larger cross-sectional area than 130. With reference to FIG. 10, this larger-diameter bore ensures that at the tip end of the shaft there is an endless, preferably annular, tip-face ridge 132 of the shaft's preferably plastic material, of low thermal conductivity, presenting less mass of this material to be heated to a stabilized temperature by the mouth (or other object whose temperature is being measured). Because of the insulating air space or clearance 133 this heating is largely via the thin tip end 134 of the plastic sheath 117 and the piece of foil 110 that is fixed to the thermistor 112 by metallic bonding material (preferably solder), having good thermal conductivity. This metallic material is between all contiguous portions of the foil and the endless ridge. Thus the heat of the object being measured is quickly transmitted to the thermistor; and thru the metallic foil the measuring current is quickly and stably conducted from the thermistor to the wires 113 and 114 in the bore and the temperature indicator.

The handle assembly 116, attached to the probe shaft, optionally may be of the type shown in FIGS. 1 to 4, FIG. 8, FIG. 11, or FIG. 14. As shown in FIGS. 8 and 9, it comprises: a support 136 having the recess or slot 138, to which the insulating, wire-holding grommet 140 is fixed; the reciprocating member 142, of resilient plastic, comprising a pair of opposite, integrally united handle portions 144, a slide bearing 146 (bearing on the shaft 108), a collet-like structure, comprising a plurality of resilient fingers 148; and the compression spring 150, acting between the shoulder 152 and the end 154 of the support 136. In forming this handle assembly the support 136 is made in three separate parts that are epoxy-bonded together: 156, 157, and 158. In fabrication: the inward end of the shaft 108 and its contained conductors (113 and 114) are threaded through the reciprocating member 142; the element 158 is moved over the shaft from its tip into position on 142; the spring 150 is slipped over the shaft and into place against the shoulder 152; the wires are threaded through a hole in a flange of 157; in this hole the grommet 140 is epoxy-bonded; the element 157 is fitted into the recess 138 and epoxy-bonded to the jaws of the recess and to the shaft 108; and the end cap 156 is epoxy-bonded to 157.

This and the other disclosed forms of the handle assembly are for the purpose of attaching a sheath to the probe, for temperature measurement; and thereafter detaching the disposable sheath. With reference to FIGS. 8 to 10: in the first step of the method of attachment of a sheath to the probe, the operator grasps the handle portions 144 and with the aid of a thumb moves the reciprocating member 142 toward the grommet-holding flange of 157, thus compressing the spring 150. Previously, while the probe was stored in its socket in the container 1, the spring has been forcing the plurality of fingers 148 in a shaft-tipward direction until their rounded ends 160 have ridden radially outward over the rounded projection 161 of the shaft and have been stopped by abutment of the elements 144 against 158. Now, with the spring compressed, the camming shoulder 163 of the fingers have been forced radially inward from their position shown in FIG. 8 by reciprocating contact with the annular ridge or camming element 164 at an end of 158, and the finger portions 165 are within the annular ridge. With the fingers thus withdrawn the tip end of the probe is moved inside one of the sheath-end enlargements or rings 125 held within one of the apertures of a face wall of a pack 2, and the shaft 108 is shoved inside the sheath until it is stopped by abutment of the end wall 66 against the ring 125, this stop 166 thus bearing via the ring against the apertured wall of the pack of sheaths. As stated above, the relative lengths of the sheath and the portion of the shaft between its tip and the rounded projection 161 are such that in this assembly the resilient sheath is slightly stretched between the shaft tip and the ring 125, thus insuring a close, tight fit between the tip end of the sheath and the foil 110. The operator then releases thumb pressure from the end cap 156, thus allowing the spring to return the fingers 148 into their radially expanded positions, forcing the rounded ends 160 that are now within the sheath outward into holding position against the ring 125 on its side toward the end of shaft 108. Then the probe is withdrawn from the pack 2, and thus sheathed it is used in measurement of temperature.

After this use the elements 144 and 156 are again moved toward each other, allowing the disposable sheath to resiliently contract and fall off into a waste container.

In FIG. 11 the sheath is shown as having been previously assembled on the probe. In this assembly, when a pack like that of FIGS. 13 or 18 is used, the rims of the holes 18 in the carton walls may be reinforced; and the portions of these rims between the holes are sufficiently wide to prevent interference between the element 170 and the adjacent rings 125 of the sheaths that temporarily will remain in the pack. In connection with this or any of the other optional forms of the handle assembly the carton of FIG. 13 or FIG. 18 may be of rigid, molded plastic.

In FIG. 11 the sheath enlargement 125 is shown as having been stretched over the spaced conical projections 168; and the ring 125 has snapped into place on the handle side of 168 and against the sloping shoulders 169 of the elements 170 of the sheath-ejecting means. This means also comprises the spaced elements 171 and the thumb piece 172, both being fixed with respect to the shoulders 169.

After use of the disposable sheath it is ejected by holding the projecting elements 173 and pushing element 172 and the connected slide 174 against the spring, thus forcing the spaced shoulders 169 between the conical projections 168 and snapping the ring 125 off 168, so that the sheath drops off the probe.

In the form of handle assembly shown in FIGS. 14 to 17, the sleeve 176, fixed to the shaft 108 serves two purposes: (1) it has an end edge, 177, which during assembly of a sheath on the probe comes into contact against the wall of the carton 2 and acts as a stop against further movement of the shaft 8 into the pack. In connection with this handle assembly, there is sufficient space between the holes 18 for the end edge 177 to go between rings 125. (2) A second purpose of the sleeve 176 is for providing a housing and slide bearing means for the movable buttons 178. These buttons are normally held in their radially outer positions, illustrated in FIG. 14, by the pair of resilient fingers 179. The fingers are here shown in their radially expanded positions, in which they hold the sheath enlargement or ring 125 while the sheath is being drawn from the pack 2 and used in temperature measurement.

In detaching a used sheath from the probe the two buttons 178 are manually pushed and slid in their sockets in the sleeve 176 toward each other, thus forcing radially inward the hooked portions 180 against the resilience of the fingers 179; and then the sheath is allowed to fall off the probe. The fingers 179 may have cutaway portions at 181, and the resultant narrowing of the resilient material causes the fingers to yield mostly at 181.

In the following claims, the word "plastic" means synthetic or natural rubber or any other kind of synthetic or natural plastic.

We claim:

1. A thermometer, including:
a probe for measurement of the temperature of an object, comprising a shaft having a longitudinal axis, temperature-sensitive free-end portion and a handle;
a stretchable probe sheath, adapted to fit over said probe shaft, having a closed end and an open end adapted to move over said free-end portion in assembly of the probe shaft and sheath, and at said open end having a portion that is thicker than said closed end; and
means for selectively holding said sheath on said shaft and selectively dislodging the sheath from said shaft, comprising: resilient, lever-like, finger means having handleward ends and other ends that are adapted to engage and hold inner sheath surfaces at said open sheath end; and means, connected to said handle, comprising a member manually movable in a direction of said longitudinal axis, for disengaging said other ends from said inner sheath surfaces, facilitating easy removal of said sheath from said probe shaft.

2. A device as set forth in claim 1, in which said member is manually movable in a direction away from said free-end portion in disengagement of said other ends from said inner surfaces.

3. A temperature-sensing probe comprising: a shaft of material of low heat conductivity, having longitudinal axis, a handle portion, a tip portion and an axial bore extending from said handle portion to said tip portion, the said bore having a greater cross-sectional area at said tip portion than at said handle portion, the tip end of said tip portion being an endless ridge, encompassing said axis, having a cross-sectional mass of said material of low heat conductivity that is less than such mass at a cross section of a middle part of said shaft; a piece of gold foil, having a heat conductivity substantially higher than that of the material of said shaft, fixed to said shaft only at said ridge; bonding material between peripheral portions of said foil and said ridge; a disk-like thermistor, fixed to a middle portion of said piece of foil, having dimensions across said axis and bore, each of which is substantially greater than its dimension along said axis; and having substantial thermally-insulating clearance between said thermistor and shaft; metallic bonding material between said thermistor and piece of foil, bonding and conducting heat between juxtaposed portions of said thermistor and foil; and electric-current-conducting means in said bore, conductively attached to said foil.

4. In a temperature-measuring device: a probe assembly, comprising: a shaft with a hole through at least a substantial portion of its length; a thermistor extending across said hole at a tip end of said shaft; a thin piece of metal fixed to said tip end; metallic bonding means between said metal piece and said thermistor; current-conducting means extending through said hole and connected to said thermistor; and a sheath-holding handle assembly; and
a disposable sheath of stretchable material having a relatively thin tip end and a relatively thick open end that comprises an enlargement, adapted to fit over said probe shaft and to be detachably held by said handle assembly;
the said handle assembly comprising at least two fingers, movable into sheath-holding engagement with said enlargement, and manually operable means, slidable in a direction of the longitudinal axis of said shaft, for removing said fingers out of said engagement and detaching said disposable sheath.

5. A thermometer, including:
a probe for measurement of temperature, comprising a shaft having a longitudinal axis, a handle portion and a temperature-sensitive free-end portion;
a probe sheath, adapted to fit over said probe shaft, having an open end adapted to move over said free-end portion in assembly of the probe shaft and sheath, and at said open end having a portion that is thicker than other portions of the sheath; and
structure for selectively holding said sheath in temperature-measuring position on said probe shaft and selectively dislodging the sheath from said shaft, including: protuberant, sheath-contacting means, comprising ribs, adapted to contact and hold said open end when the sheath is in said temperature-measuring position; and structure, including manually movable means, slidably mounted at said handle portion, for separating said open end from said sheath-contacting means and dislodging the sheath from said shaft; the said manually movable means comprising at least one projection, movable in a space between ribs.

6. A thermometer, including:
a probe for measurement of temperature, comprising a shaft having a longitudinal axis, a handle portion and a temperature-sensitive free-end portion;
a probe sheath, adapted to fit over said free-end portion in assembly of the probe shaft and sheath, and at said open end having a portion that is thicker than other portions of the sheath; and
structure for selectively holding said sheath in temperature-measuring position on said probe shaft and selectively dislodging the sheath from the shaft, including: protuberant sheath-contacting means adapted to contact and hold said open end when the sheath is in said temperature-measuring position; and structure, comprising manually movable means slidably mounted at said handle portion, for separating said open end from said sheath-contacting means and dislodging the sheath from said shaft; the said protuberant means comprising a plurality of resilient fingers, having ends that are fixed to said shaft and other end portions adapted to engage an inner surface of said open end when the sheath is in said temperature-measuring position; the said handle portion including projecting means extending over part of said other end portions; and the said manually movable means comprising a plurality of buttons, having axes transverse to said longitudinal axis, slidably mounted in apertures in said projecting means, manually operable for removing said other ends out of engagement with said inner surface.

7. A thermometer, including:

a probe for measurement of temperature, comprising a shaft having a longitudinal axis, a temperature-sensitive free-end portion;

a probe sheath, comprising resilient material, adapted to fit over said probe shaft, having an open end adapted to move over said free-end portion in assembly of the probe shaft and sheath, and at said open end having a portion that is thicker than other portions of the sheath; and structure for selectively holding said sheath in temperature-measuring position on said probe shaft and selectively dislodging the sheath from said shaft, comprising: sheath-contacting means, adapted to contact and hold the said thicker portion at said open end when the sheath is in said temperature-measuring position; manually movable means slidably mounted at said handle portion; and means, cooperating with said manually movable means, for separating said thicker portion and open end from said sheath-contacting means and dislodging the sheath from said shaft.

8. A thermometer as set forth in claim 7, in which: the said thicker sheath portion comprises a resilient ring; said sheath-contacting means comprises movable protuberant means on said shaft, contacting an inner surface of said ring when the sheath is in temperature-measuring position; and the said means cooperating with the manually movable means comprises cam surfaces.

9. A thermometer as set forth in claim 5, in which: said thicker portion of the sheath is resilient; the said protuberant means comprises projections, each of which merges into surface of said shaft at one of its ends and at its other, handleward end having a sheath-holding surface, steeply transverse to a plane parallel to said longitudinal axis; the said resilient thicker portion being adapted to snap into sheath-holding position on the handleward side of said sheath-holding surfaces.

10. A thermometer as set forth in claim 5, in which: said protuberant means comprises a plurality of resilient fingers, having handleward ends and other, end portions that are adapted to engage said inner surface; said handle portion inlcudes projecting, camming means extending over portions of said fingers; said end portions include camming elements; and said manually movable means comprises an element, slidably mounted on said shaft and within part of said projecting means, force-transmittingly connected to said handleward ends.

11. A device as set forth in claim 3, further comprising a disposable sheath of thin material, fitted over said probe end, having a blunt tip end contiguous to tip-end portions of said foil.

12. A device as set forth in claim 7, further comprising: a pack, comprising an apertured wall, having a plurality of holes; and a plurality of disposable sheaths, each of which comprises a closed tip portion at one of its ends and a said open end comprising a relatively thick sheath enlargement which fits against said wall around one of said holes; and in the device the said handle portion comprises stop means, bearing against said apertured wall, for limiting the travel of said shaft into said pack and into said sheath.

13. A device as set forth in claim 12, in which said stop means comprises an abutment that bears against said enlargement and thru the enlargement against said apertured wall.

14. A device as set forth in claim 4, in which said fingers are of resilient plastic.

15. A device as set forth in claim 4, in which the length of said sheath is less than the distance between said tip-end piece of metal and said fingers.

16. A device as set forth in claim 4, in which ends of said fingers fit within said enlargement.

17. A device as set forth in claim 4, in which ends of said fingers are rounded.

18. An assembly as set forth in claim 1, in which said sheath-holding means comprises camming means, at least a portion of which is shiftable longitudinally of said shaft, for effecting transverse movement of said finger means.

* * * * *